Patented Oct. 25, 1932

1,885,096

UNITED STATES PATENT OFFICE

CARL HANER, OF MOYLAN, AND OSCAR GAMPER, OF PHILADELPHIA, PENNSYLVANIA, ASSIGNORS TO PUBLICKER, INC., OF PHILADELPHIA, PENNSYLVANIA, A CORPORATION OF DELAWARE

PROCESS OF PRODUCING BUTYL ALCOHOL AND ACETONE, AND ETHYL ALCOHOL

No Drawing. Application filed December 19, 1929. Serial No. 415,367.

Our invention relates to the production of butyl alcohol and acetone by a fermentation process and to the production of ethyl alcohol from the same mash after the butyl alcohol fermentation has become fully active and prior to its cessation whereby it is possible to utilize all of the fermentable sacchariferous material in the mash without sacrificing the yield.

An object of this invention is to provide a process for the production of butyl alcohol and acetone by the fermentation of a mash of suitable composition in which process there is no loss of materials due to the presence of unfermented sacchariferous material in the mash after fermentation, the process contemplating the production of ethyl alcohol in the mash after the butylic alcohol fermentation has become fully active.

Another object is the utilization in the production of ethyl alcohol of a waste material which heretofore has represented a loss of fermentable sugars but which by our process serves as a source of sugar material in the fermentation by yeast to procure ethyl alcohol.

These and various other objects of our invention will become apparent on consideration of the disclosure of the specific examples according to which the invention may be employed, as set forth in the following specification. It will be understood that further modifications than those given in the examples can be made that fall within the scope of our invention.

In the production of butyl alcohol and acetone from sacchariferous materials, certain bacilli capable of fermenting these materials into the butyl alcohol and acetone are added to a mash or wort of the proper composition as regards bacillus nutriment and the fermentation allowed to proceed under suitable conditions until all the sacchariferous materials that can be, have been fermented into butyl alcohol and acetone. Various bacilli, such as clostridium pectinovorum, clostridium butyricum, bacillus butylicus, bacillus aceto-butylicum or other butyl alcohol bacilli that have been described by Prazmoski, Fitz, Beyerink and others, are applicable and are used in such processes. In the production of butyl alcohol and acetone by this fermentation process, however, there is always an accompanying loss of the raw materials, when concentrations that are economical are used, due to the incomplete conversion of the sacchariferous material into the products of fermentation. At the end of fermentation producing butyl alcohol and acetone, there is left in the mash a certain amount of sugar which has not been fermented by the bacilli. The loss of sugar represents an undesirable feature in the production of butyl alcohol and acetone in concentrated mashes which the workers in the art have endeavored to circumvent by the re-cultivation and re-utilization of the mash in subsequent runs if the amount of unfermented material is sufficient to warrant the trouble and expense. This attempted re-utilization is expensive and is generally found to be unprofitable particularly if the values of the spent mash are low.

Our invention is characterized by a process, the use of which accomplishes substantially complete utilization of the fermentable sugar material in the wort. This utilization of the fermentable sugar material is brought about by the fermentation of that portion of the sugar material which is not used in the manufacture of butyl alcohol and acetone into ethyl alcohol by the addition to the mash of ethyl-alcohol-producing yeast ferment. This secondary fermentation of the residual fermentable sugar into ethyl alcohol takes place after the butyl alcohol fermentation has become fully active and prior to its cessation. In this case, the production of ethyl alcohol does not affect the production of butyl alcohol and acetone which remain the primary products of the process. This transformation of the fermentable sugar material, which would otherwise be lost, into the valuable by-product, ethyl alcohol, obviously reduces the cost of production of the butyl alcohol and acetone materially. There is also furnished a new source of ethyl alcohol from a material which has heretofore been of no value.

The yeast may be added to the mash at any time after the butyl alcohol fermentation has become fully active and prior to the cessation thereof. The mash is then completely fermented and the three products of the fermentation, the butyl alcohol, the acetone, and the ethyl alcohol are then recovered by fractional distillation.

In the preferred procedure, as will more fully appear hereinafter, the mash is inoculated with the butylic bacilli and the primary fermentation allowed to proceed until the butyl alcohol fermentation has become fully active. Yeast is then added and the primary and secondary fermentation then proceeds in parallel, each producing their respective products. This method reduces the total fermentation time materially and therefore is particularly desirable in large scale operations. Furthermore, the shortened fermentation period tends to prevent the formation of excessive or injurious acidity. The acid that is developed during the fermentation is held in check and does not stop or slacken the activity of the ferments. The combined action of the two ferments also appears to insure a more complete fermentation of the fermentable sugar material than is possible if the primary fermentation is first carried to completion before the secondary fermentation is started.

For the carrying out of the process, any mash which contains sacchariferous materials may be employed. The process, however, is not operative with mashes of starch or other amylaceous materials, for while butyl alcohol and acetone will be formed, the yeast will not act upon these amylaceous materials to convert them into ethyl alcohol. In using cereals, such as corn and barley malt, or using other starch or amylaceous materials such as potatoes, it is necessary first to saccharify the starch into sugar. This is accomplished in the usual way with the aid of malt, or other diastatic material. However, due to the inherent difficulties present in the saccharification process, the expense involved and the relatively low dilution of the mash resulting, I have found it preferable to employ as the sugar material in the mash a material naturally containing sugar, such as cane or beet molasses. With the use of these raw materials, while it is advisable to add further nutriment, no expensive saccharification procedure is necessary and it is possible to use a mash of that dilution which is most desirable for the process. The composition of the molasses mash, its treatment, and dilution will be considered hereinafter more fully.

The process of the present invention can be satisfactorily and economically carried out with higher concentrations than those heretofore employed, for, if the sugar content is not economically consumed in the production of butyl alcohol and acetone, the unfermented portion will be converted into ethyl alcohol. The use of the higher concentrations not only renders the recovery of the products by distillation more economical, but protects the enzymes of the bacilli against objectionable, contaminating acid fermentation, such as butyric.

The particular concentration of the mash to be used, will depend on various factors. Very satisfactory results are obtained by the use of a mash of a concentration above 13° Brix. In the specific example, hereinafter described, a mash of about 12½% by volume or 16½% by weight of molasses, registering approximately 15° Brix is given.

It often happens in the production of butyl alcohol and acetone that for reasons beyond control of the operator, the butyl alcohol and acetone yields are low. If this is encountered in the prosecution of my process, the ethyl alcohol yields will be correspondingly high. If, on the other hand, the butyl alcohol and acetone yields are high, which condition is to be preferred, the ethyl alcohol yield is correspondingly low. For all practical purposes, the presence of the yeast in the mash and its fermentative action to produce ethyl alcohol does not interfere with the yields of butyl alcohol and acetone which would have been obtained had no yeast been added to the mash. In some instances, the yield of butyl alcohol and acetone may vary from 6% to 12%, in which cases the corresponding variation in the amount of ethyl alcohol produced will occur. The secondary fermentation, which results in the production of the ethyl alcohol, may therefore be considered a factor which insures the utilization of that portion of the sugar material which would otherwise remain unused and which would represent a loss.

In a typical example of carrying our process using molasses as a source of sugar, we may proceed as follows:

The isolation of the organism for the butyl fermentation is accomplished in the usual way—by heat treatment, and pure culture method. To a small laboratory mash composed of 6½% to 7% of molasses, 2% to 3% of malt sprouts, and 90 to 91½% of water, .3% to .6% of chalk, .2% of ammonium chloride, and .07% of calcium chloride are added, all percentages being by weight. The mash is sterilized by heating and is cooled and completely neutralized with bicarbonate of soda, using bromo-thymol-blue as an indicator. The mash at a temperature of 100° F. is inoculated with a culture of bacilli which mash is then allowed to develop for twenty-four to thirty hours in the incubator at a temperature of 94° to 104° F. Another seed mash with the same proportions of the materials given above amounting to not less than approximately 5% and preferably 10% to 15% in volume of the main mash to be fermented is prepared. The seed mash containing the bacilli after incubation as described and this second mash are mixed and fermentation allowed to proceed for twenty-four hours at a temperature of about 98° F. The resulting seed mash is then ready for transference to the main mash to bring about the desired fermentation.

The main mash is prepared by mixing 12½% molasses by volume and 87½% water by volume which results in a Brix reading of about 15°. After mixing, the mash is sterilized either by boiling for about one hour or by passing steam therethrough. This sterilization by heat can be dispensed with if the mash is treated with carbon dioxide or fermentation gases until substantially all the air is expelled, which process is the subject matter of an application filed by Carl Haner December 16, 1929, Serial Number 415,365. After sterilization or treatment with carbon dioxide various additions of supplemental nutriment may be made to this mixture of molasses and water. Any one of the following additions have proved to be satisfactory:

Formula (A):
Monoammonium phosphate ($NH_4H_2PO_4$) ---------- .5% to 1% calculated on the molasses
Bicarbonate of soda -------- 2% to 2.5% calculated on the molasses (for neutralization)

Formula (B):
Ammonium chloride -------- 1.8% calculated on the molasses
Chalk -------------------- .7% calculated on the molasses
Bicarbonate of soda -------- 1.0% calculated on the molasses Formula (C):
Monoammonium phosphate ($NH_4H_2PO_4$) ---------- .5% calculated on the molasses
Chalk -------------------- 1.0% calculated on the molasses
Calcium chloride ---------- 1.0% calculated on the molasses Since formulæ A and C include the addition of the phosphorous containing material as well as a nitrogen supplying compound, they have proved particularly successful. The calcium chloride added in formula C promotes sporulation and with the chalk tends to counteract any acidity. The temperature of the mash is then adjusted to 100° F. and the mash inoculated with the seed mash containing the activated bacilli. At this stage, the Brix reading is approximately 13° to 13½°. The mash at the time of the inoculation with the seed mash must be neutral or very nearly neutral. It should not give a titration reading of over .3 cc. of ⅕ normal sodium hydroxide solution using 20 cc. of mash with bromo-thymol-blue as an indicator. The fermentation becomes vigorous in a few hours time and it is preferable to conduct the fermentation under a light pressure, say about ½ pound per square inch to insure purity. If the fermentation is carried on under light pressure, the fermentation gases can be easily recovered.

While fermentation is still active, the ethyl-alcohol-producing yeast ferment is added, for example, about twenty to twenty-four hours after the start of the butylic fermentation, at which time the butyl alcohol and acetone are being produced at the maximum rate. The acidity of the mash at this stage generally has a titration reading of 1 cc. to 2 cc. using 20 cc. of mash and ⅕ normal sodium hydroxide as the alkali with bromo-thymol-blue as an indicator. With acidity readings higher than these figures, a neutralizing agent should be added, for the acidity as it increases tends to hinder complete fermentation. In inoculating with yeast at least 10% yeast mash based on the total mash is added. The primary and secondary fermentations proceed in parallel, each producing its own products, and the fermentation is complete in forty-eight to sixty hours after the start of the butylic fermentation. When the fermentation is complete, a gravity of about 5° Brix, and an acidity reading of 3 cc. to 4 cc. using 20 cc. of mash and 1.5 normal caustic soda as an alkali, will be obtained. There will be present in the mash between 2.5% to 3.0% ethyl alcohol by volume. The whole mash is subjected to fractional distillation to recover the butyl alcohol, the acetone and the ethyl alcohol. On 100 gallons of molasses, the yield averages six gallons butyl alcohol, three gallons acetone, and seventeen gallons ethyl alcohol.

Obviously, since the present invention is applicable for use in conjunction with any sacchariferous mash capable of producing butyl alcohol and acetone by fermentation, the steps in carrying out the fermentation may vary widely as to times, temperatures, concentrations and the like, without departing from the essence of the invention.

We claim:
1. The process of producing butyl alcohol and acetone, and ethyl alcohol from the same mash which comprises preparing a mash containing sacchariferous material and other nutriment suitable for butylic fermentation, inoculating said mash with butylic bacilli, allowing the butylic fermentation to become fully active, thereupon inoculating said mash with ethyl-alcohol-producing yeast ferment, allowing the fermentations to proceed to completion, and thereafter distilling the mash to recover the products of the fermentations.

2. The process of producing butyl alcohol and acetone, and ethyl alcohol from the same mash which comprises preparing a mash containing sacchariferous material and other nutriment suitable for butylic fermentation, inoculating said mash with butylic bacilli, allowing the butylic fermentation to become fully active, thereafter and before completion of the butylic fermentation inoculating with ethyl-alcohol-producing yeast ferment, allowing the butylic and ethylic fermentations to proceed to completion, and thereafter distilling to recover the products of the two fermentations.

3. The process of producing butyl alcohol and acetone, and ethyl alcohol from the same mash which comprises preparing a mash containing molasses and other nutriment suitable for butylic fermentation, inoculating said mash with butylic bacilli, allowing the butylic fermentation to proceed in the neighborhood of from twenty to twenty-four hours, inoculating said mash with ethyl-alcohol-producing yeast ferment, allowing the butylic and ethylic fermentations to proceed to completion and thereafter distilling the mash to recover the butyl alcohol, acetone and ethyl alcohol produced.

4. The process of producing butyl alcohol and acetone, and ethyl alcohol from the same mash which comprises preparing a mash with a Brix reading of over 13°, containing sacchariferous material and other nutriment suitable for butylic fermentation, inoculating said mash with butylic bacilli allowing the butylic fermentation to become fully active, thereupon inoculating said mash with ethyl-alcohol-producing yeast ferment, allowing the fermentations to proceed to completion, and thereafter subjecting the mash to distillation to recover the butyl alcohol, acetone, and ethyl alcohol.

5. The process of producing butyl alcohol and acetone, and ethyl alcohol from the same mash which comprises preparing a mash with a Brix reading of over 13°, containing sacchariferous material and other nutriment suitable for butylic fermentation, inoculating said mash with butylic bacilli, allowing the butylic fermentation to become fully active, thereafter and before completion of the butylic fermentation inoculating with ethyl-alcohol-producing yeast ferment, allowing the butylic and ethylic fermentations to proceed to completion, and thereafter distilling to recover the products of the two fermentations.

6. The process of producing butyl alcohol and acetone, and ethyl alcohol from the same mash which comprises preparing a mash with a Brix reading of approximately 15°, containing molasses and other nutriment suitable for butylic fermentation, inoculating said mash with butylic bacilli, allowing the butylic fermentation to proceed in the neighborhood of from twenty to twenty-four hours, inoculating said mash with ethyl-alcohol-producing yeast ferment, allowing the butylic and ethylic fermentations to proceed to completion and thereafter distilling the mash to recover the butyl alcohol, acetone and ethyl alcohol produced.

7. The process of producing butyl alcohol and acetone, and ethyl alcohol from the same mash, which comprises preparing a mash containing sacchariferous material and other nutriment suitable for butylic fermentation, inoculating said mash with butylic bacilli, fermenting the mash to a point approximating that at which the rate of production of butyl alcohol and acetone is at the maximum, thereupon inoculating said mash with ethyl-alcohol-producing ferment, allowing the fermentation to proceed to completion, and thereafter distilling the mash to recover the products of the fermentations.

8. The process of producing butyl alcohol and acetone, and ethyl alcohol from the same mash, which comprises preparing a mash containing sacchariferous material and other nutriment suitable for butylic fermentation, inoculating said mash with butylic bacilli, fermenting the mash to a point approximating that at which the rate of production of the butyl alcohol and acetone is at a maximum, thereafter and before completion of the butylic fermentation inoculating the mash with ethyl-alcohol-producing yeast ferment, allowing the butylic and ethylic fermentations to proceed to completion, and thereafter distilling to recover the products of the two fermentations.

CARL HANER.
OSCAR GAMPER.